No. 620,633. Patented Mar. 7, 1899.
W. T. BARNUM.
SPIROMETER.
(Application filed June 14, 1897.)
(No Model.)
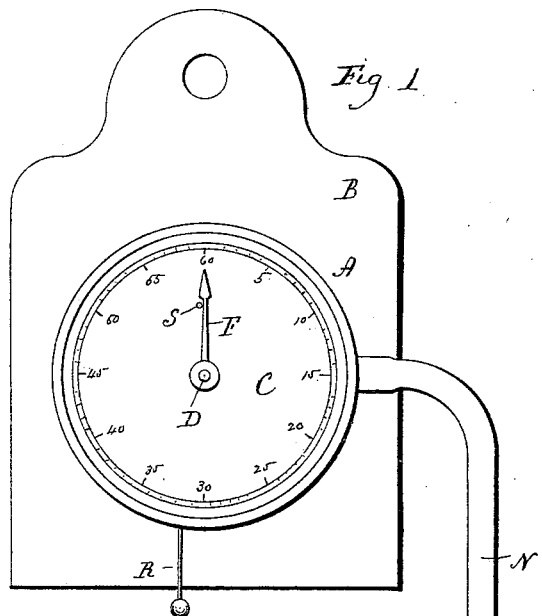
Fig. 1.
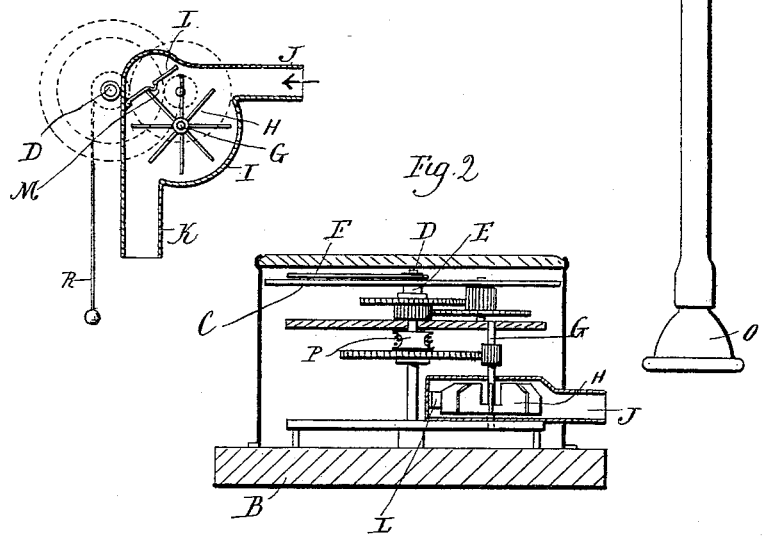
Fig. 3.
Fig. 2.
Witnesses.
J. W. Shumway.
Lillian D. Kelsey.
William T. Barnum,
Inventor.
By atty Earle H. Seymour
THE NORRIS PETERS CO., PHOTO-LITHO., WASHINGTON, D. C.

UNITED STATES PATENT OFFICE.

WILLIAM T. BARNUM, OF NEW HAVEN, CONNECTICUT.

SPIROMETER.

SPECIFICATION forming part of Letters Patent No. 620,633, dated March 7, 1899.

Application filed June 14, 1897. Serial No. 640,634. (No model.)

*To all whom it may concern:*

Be it known that I, WILLIAM T. BARNUM, of New Haven, in the county of New Haven and State of Connecticut, have invented a new Improvement in Spirometers; and I do hereby declare the following, when taken in connection with the accompanying drawings and the letters of reference marked thereon, to be a full, clear, and exact description of the same, and which said drawings constitute part of this specification, and represent, in—

Figure 1, a face view of a spirometer constructed in accordance with my invention; Fig. 2, a sectional view thereof; Fig. 3, a vertical section illustrating the casing and brake mechanism of the fan-wheel.

This invention relates to an improvement in spirometers, the object being to produce a device by which the capacity of the lungs may be measured and which shall be so simple as to permit of its being manufactured for sale at a very low price; and it consists in the construction as hereinafter described, and particularly recited in the claim.

The device, which is preferably inclosed within a case A, mounted on a board or backing B, which may be conveniently suspended, contains a dial C, the face of which is divided into any convenient number of divisions, which may be suitably indicated. Through the case extends a central shaft D, on the outer end of which is mounted a sleeve E, which carries the pointer F. Parallel with the said shaft D is a driving-shaft G, upon which is mounted a fan-wheel H. The shaft G is connected with the sleeve E by a suitable train of gearing, and so that a large number of revolutions of the shaft G are required to cause the pointer to make one complete revolution. The fan-wheel H is inclosed in a casing I, into which an inlet-passage J opens through the side of the case and into the path of the fans, and also an outlet-passage K through the bottom of the case. Within the casing and in the path of the periphery of the fan-wheel is a brake, which preferably consists of a strip L of thin sheet metal or other suitable material formed with a transverse rib M, which normally bears against the outer end of one of the fans, so as to arrest rotation in either direction, but which may be lifted so as to clear the fans by the force of air entering the inlet J. To the inlet J a tube N is attached, which is provided with a suitable mouthpiece O. On the shaft D is a grooved roller P, to which a cord R is attached, which cord depends through the bottom of the case and so that as the shaft revolves in one direction it will wind the cord around the roller. Projecting from the face of the dial, at one side of its vertical center, is a stop-pin S, against which the pointer will bear when in its vertical or starting position.

The operation of the device is as follows: The pointer being at the starting-point, the capacity of the lungs is discharged through the tube N and causes the fan-wheel H to revolve, the revolution of which through the gearing revolves the pointer, and the gearing is such that only an abnormal lung capacity will be capable of causing the pointer to make a complete revolution. As the pointer revolves the cord is wound upon the roller P, and so that after the pointer has been moved from its starting-point it may be returned thereto by drawing upon the cord. As before stated, the inward pressure of air will lift the brake out of the path of the fan-wheel, so as to permit it to freely revolve, yet when the pressure ceases the brake will fall into the path of the fan-wheel, so as to arrest its further movement, and so that the pointer cannot be moved by the momentum or overmotion of the fan-wheel.

It is evident and apparent without further illustration that instead of arranging a fan-wheel which moves by pressure against its periphery one may be substituted which moves by force of air in the direction of its axis, such a form of fan-wheel being common and well known. I therefore do not wish to be understood as limiting my invention to the exact form herein shown. I am aware, however, that spirometers comprising a case, dial-pointer, and fan-wheel geared with the pointer, and means for directing a current of air to the fan-wheel, the revolution of which is indicated on the dial by the pointer, have been employed, and therefore do not wish to be understood as claiming such as my invention.

Having fully described my invention, what I claim as new, and desire to secure by Letters Patent, is—

In a spirometer, the combination with the case thereof, of a dial, a pointer mounted on a shaft extending through said dial, a fan-wheel mounted in the said case, gearing between said fan-wheel and pointer whereby the movement of the fan-wheel will cause the pointer to sweep said dial, a casing inclosing said fan-wheel, an inlet and outlet therefrom, and a brake mounted in said case adjacent to said fan-wheel and so as to be actuated by a current of air passing through said case, whereby said brake is released, said brake adapted to normally resist the rotation of said wheel.

In testimony whereof I have signed this specification in the presence of two subscribing witnesses.

WILLIAM T. BARNUM.

Witnesses:
FRED. C. EARLE,
LILLIAN D. KELSEY.